United States Patent [19]

Nohara

[11] Patent Number: 6,135,180

[45] Date of Patent: Oct. 24, 2000

[54] RUBBER COMPOSITION FOR TREAD AND PNEUMATIC TIRE

[75] Inventor: Daisuke Nohara, Kodaira, Japan

[73] Assignee: Bridgestone Corporation, Tokyo, Japan

[21] Appl. No.: 09/343,507

[22] Filed: Jun. 30, 1999

[30] Foreign Application Priority Data

Jul. 3, 1998 [JP] Japan .................................. 10-189120

[51] Int. Cl.$^7$ ................................ B60C 11/00; C08J 9/00
[52] U.S. Cl. .................... 152/209.1; 521/84.1; 521/139; 521/140; 521/143; 521/144
[58] Field of Search .................... 521/84.1, 139, 521/140, 143, 144; 152/209 R

[56] References Cited

U.S. PATENT DOCUMENTS

| | | |
|---|---|---|
| 4,675,349 | 6/1987 | Palombo et al. . |
| 5,341,869 | 8/1994 | Kidaloski et al. . |

FOREIGN PATENT DOCUMENTS

| | | |
|---|---|---|
| 4-368205 | 12/1992 | Japan . |
| 7-315011 | 12/1995 | Japan . |
| 9-254606 | 9/1997 | Japan . |
| 10-67886 | 3/1998 | Japan . |

*Primary Examiner*—Morton Foelak
*Attorney, Agent, or Firm*—Sughrue, Mion, Zinn, Macpeak & Seas, PLLC

[57] ABSTRACT

A rubber composition for a tire tread comprising a foamed rubber composition prepared by blending 100 parts by weight of at least one rubber component selected from the group consisting of natural rubber and diene based synthetic rubbers with 1 to 40 parts by weight of a thermoplastic resin having a melting point of 120 to 130° C., a density of 0.92 to 0.935 and a softening point of 80 to 110° C., and a pneumatic tire using the above rubber composition for a tire tread part. The above thermoplastic resin is preferably a linear polyethylene or a modified linear polyethylene obtained by modifying a part of a linear polyethylene.

4 Claims, No Drawings

RUBBER COMPOSITION FOR TREAD AND PNEUMATIC TIRE

BACKGROUND OF THE INVENTION

1. Field of the Invention

The present invention relates to a rubber composition for a tire tread and a pneumatic tire using the rubber composition.

2. Description of the Related Art

In general, a tread rubber composition for a studless tire is required first to improve in a braking performance on ice. However, it is required to improve concurrently in abrasion resistance, tear resistance and crack resistance.

A tire performance on ice can be improved by application of foamed rubber and a tread pattern technique, but in these methods the cell fraction and the edge parts have to be increased, respectively, and these methods lead to a reduction in the abrasion resistance, the tear resistance and the crack resistance.

Further, a method in which glass beads, rice hulls and walnut husk pieces are mixed to raise the performance on ice is known as well, but these walnut husk pieces and the like act as breaking nuclei in a rubber composition to result in reducing the abrasion resistance, the tear resistance and the crack resistance.

A method in which a large amount of high grade carbon black is blended in rubber is known as a method for improving abrasion resistance of a tire, but this method brings about an increase in the hardness of the rubber composition and a reduction in the tensile elongation at break and leads to a reduction in the tear resistance and the crack resistance.

Further, if the tear resistance and the crack resistance are intended to be improved by using rubber composition having specific physical properties, application of any of foaming, foreign materials and high grade carbon black brings about an adverse effect, and therefore the existing situation is that only a device on a tread pattern design is adopted.

In addition thereto, a method in which polyethylene is blended is known as a method for improving the abrasion resistance, the tear resistance and the crack resistance.

For example, a rubber composition which comprises 100 parts by weight of a rubber component blended with 2 to 75 parts by weight of high density polyethylene (20% by weight of high density polyethylene having cross-linkable parts is included therein) and which is kneaded at a temperature higher than the melting point of the blended resin is proposed in Japanese Patent Application Laid-Open No. Hei 10-67886 which is a prior application filed by the present asignee. Polyethylene C (Comparative Examples 9 and 11) shown in Table 1 has a melting point of 124° C. and a density of 0.923, and it is disclosed that the rubber compositions (Comparative Examples 9 and 11) blended with this polyethylene C fails in targeted hardness and has a large permanent set.

Further, proposed in Japanese Patent Application Laid-Open No. Hei 9-254606 is a pneumatic tire for a heavy load in which a rubber composition comprising a rubber component having a specific composition blended with a polyethylene having a melting point of 120° C. or higher (135° C. in the examples) and carbon black having specific physical properties in specific amounts is used for a tread rubber in which the abrasion resistance is allowed to be compatible with the rupture resistance.

Further, known as pneumatic tires blended with polyethylene are, for example, a pneumatic tire disclosed in U.S. Pat. No. 4,675,349, wherein a polyethylene having a softening point of 135° C. or higher is blended at a temperature lower than the softening point and a pneumatic tire disclosed in U.S. Pat. No. 5,341,869, which uses low density polyethylene (LDPE) whose crystal has a melting point falling in a range of 104 to 115° C.

However, it is neither described nor suggested in these official gazettes to apply polyethylene (PE) to a foamed rubber. In addition, investigations made by the present inventor have revealed the problem that when applying PE to a foamed rubber, a cell fraction of the vulcanized rubber composition becomes unstable.

Further, there are the problems that the viscosity of the rubber composition increases at an extruding step, where PE and a foaming agent are blended, to reduce the workability, and that because the temperature is elevated, foaming starts locally to consume a part of the foaming agent, so that the cell fraction of the finished tire becomes unstable and the performance on ice, which is the original object, is reduced. The higher the softening point (120 to 130° C.) of the resin compared with the extrusion temperature (100 to 110° C.), the more this fact is notable. In general, high density PE has the drawback that the blending thereof brings about an increase in the viscosity of the rubber composition at a working temperature because of the high melting point thereof to deteriorate the extrusion workability, and low density PE causes the problem that the tire is inferior in durability.

SUMMARY OF THE INVENTION

The present invention intends to solve the conventional problems described above, and an object thereof is to provide a rubber composition for a tire tread which is excellent in abrasion resistance, tear resistance, crack resistance, extrusion stability and a tire performance on ice, and a pneumatic tire.

Intensive investigations continued by the present inventor have resulted in finding that the conventional problems described above can be solved by using a foamed rubber composition prepared by blending PE having a specific structure and a specific softening point, that is, polyethylene having a relatively high melting point and a relatively low softening point in combination with a foaming agent, and thus completed are a foamed rubber composition for a tire tread used for a studless tire in which the durability (abrasion resistance, crack resistance and tear resistance: the melting point is involved therein) can be compatible with the processability and the workability (the softening point is involved therein), and a pneumatic tire.

That is, the present invention can be described as any of the following items (1) to (3):

(1) A rubber composition for a tire tread comprising a foamed rubber composition prepared by blending 100 parts by weight of at least one rubber component selected from the group consisting of natural rubber and diene based synthetic rubbers with 1 to 40 parts by weight of a thermoplastic resin having a melting point of 120 to 130° C., a density of 0.92 to 0.935 and a softening point of 80 to 110° C.

(2) The rubber composition for a tire tread as described in these above item (1), wherein the thermoplastic resin described above is a linear polyethylene or a modified linear polyethylene obtained by modifying a part of a linear polyethylene.

(3) A pneumatic tire comprising a tread portion characterized by using the rubber composition for a tire tread as described in the above item (1) or (2) for the tread portion.

DETAILED DESCRIPTION OF THE PREFERRED EMBODIMENT

The embodiment of the present invention shall be explained below in detail.

The rubber composition for a tire tread according to the present invention is characterized by comprising a foamed rubber composition prepared by blending 100 parts by weight of at least one rubber component selected from the group consisting of natural rubber and diene based synthetic rubbers with 1 to 40 parts by weight of a thermoplastic resin having a melting point of 120 to 130° C., a density of 0.92 to 0.935 and a softening point of 80 to 110° C.

The thermoplastic resin has to have a melting point of 120 to 130° C., a density of 0.92 to 0.935 and a softening point of 80 to 110° C., preferably a melting point of 122 to 127° C., a density of 0.92 to 0.93 and a softening point of 80 to 105° C.

This is because if the melting point exceeds 130° C., a part of the resin may not be molten in kneading under a mild kneading condition and may not be dispersed in the rubber in a certain case. On the other hand, when the melting point is lower than 120° C. and the density is less than 0.92, the phase itself reinforced by the thermoplastic resin in the rubber has low strength, and therefore improvement in the abrasion resistance, the tear resistance and the crack resistance is not attained.

Further, if the softening point exceeds 110° C., a rise in the viscosity of the rubber composition at an actual operating temperature (100 to 110° C.) at an extruding step is brought about, and the workability is deteriorated. On the other hand, if the softening point is lower than 80° C., there is the fear that the tread rubber may be softened during running, and therefore such softening temperatures are not preferred.

The blending amount of the thermoplastic resin having the characteristics described above has to be 1 to 40 parts by weight, preferably 2 to 15 parts by weight per 100 parts by weight of the rubber component.

This is because the blending amount of less than 1 part by weight can not achieve the effects of the invention, and the blending amount exceeding 40 parts by weight increases the thermal shrinkage of the non-vulcanized rubber composition to deteriorate the extrusion workability.

The thermoplastic resin having the characteristics described above used in the present invention is preferably a linear polyethylene or a modified linear polyethylene obtained by modifying a part of a linear polyethylene from the viewpoint of further improving the effects of the present invention. However, it shall not specifically be restricted so long as it is a resin satisfying the conditions described above.

The linear polyethylene used in the present invention is obtained by copolymerizing ethylene with an α-olefin in the presence of a polymerization catalyst. The catalyst and the polymerization method shall not specifically be restricted, and the catalyst includes, for example, Ziegler type catalysts, Philips type catalysts and so-called metallocene catalysts obtained by combining alumoxane with publicly known metallocene compounds in which a ligand having one or two cyclopentadienyl skeletons coordinates to a transition metal of the fourth to sixth groups in the periodic table, preferably zirconium or hafnium. The polymerization method includes a vapor phase method, a solution method and a high pressure ion polymerization method which is carried out under a pressure of 200 kg/cm$^2$ or more at a polymerizing temperature of 150° C. or higher.

The α-olefin used as the comonomer is 1-olefin having 3 to 12 carbon atoms (represented by a formula R—CH=CH$_2$, wherein R represents an alkyl group) and includes, for example, propylene, butene-1, pentene-1, hexene-1, 4-methylpentene-1, 4-methylhexene-1, 4,4-dimethylpentene-1, heptene-1, octene-1, nonene-1, decene-1, undecene-1, and dodecene-1, preferably propylene, butene-1, hexene-1, 4-methylpentene-1 and octene-1.

In this case, the α-olefin shall not be restricted to a single kind, and two or more kinds thereof may be used to form a multicomponent copolymer such as a terpolymer.

The rubber component used in the present invention includes natural rubber (NR) and diene based synthetic rubbers, and the diene based synthetic rubbers include, for example, isoprene rubber (IR), styrene-butadiene rubber (SBR), butadiene rubber (BR) and acrylonitrile-butadiene rubber (NBR). At least one of them can be used.

Further, in order to obtain the rubber composition of the present invention for a tire tread which is excellent in a performance on ice, abrasion resistance, tear resistance, crack resistance and extrusion stability, which is the object of the present invention, the rubber component described above and the thermoplastic resin having the characteristics described above are blended, and in addition thereto, a foaming agent is blended preferably in an amount of 0.5 to 15.0 parts by weight, more preferably 2.0 to 8.0 parts by weight per 100 parts by weight of the rubber component to prepare a foamed rubber composition.

Foaming agents usually used for conventional foamed rubbers can be used as the foaming agent used in the present invention and include, for example, decomposition type foaming agents including azo compounds such as azodicarbonamide (ADCA), azobisformamide (ABFA), azobisisobutyronitrile (AIBN) and diazoaminobenzene (DAB), nitroso compounds such as N,N'-dinitrosopentamethylenetetramine (DPT) and N,N'-dimethyl-N,N'-dinitrosoterephthalamide (DMDNTA), and hydrazides such as p,p'-oxybis (benzenesulfonyl)hydrazide (OBSH), benzenesulfonylhydrazide (BSH) and toluenesulfonylhydrazide (TSH). Further, urea base foaming aids can be used in combination with these foaming agents.

Cells formed in the rubber composition by foaming action of the foaming agent at a vulcanizing step preferably have a whole cell fraction (porosity) of 2 to 50%, more preferably 5 to 25%.

Here, cell fraction $V_s$ of cells is expressed in the following equation:

$$V_s = \{(\rho_0 - \rho_g)/(\rho_1 - \rho_g) - 1\} \times 100 (\%) \qquad (1)$$

wherein $\rho_1$ is the density (g/cm$^3$) of a foamed rubber, $\rho_0$ is the density (g/cm$^3$) of the solid part of the foamed rubber and $\rho_g$ is the density of the gaseous part in the cells of the foamed rubber.

The foamed rubber is composed of solid parts and gaseous parts in the voids (closed cells) formed in the solid parts, that is, the cells. The density $\rho_g$ of the gaseous parts is extremely small, nearly zero, and it is very small with respect to the density $\rho_1$ of the solid parts. Therefore, equation (1) is almost equivalent to the following equation:

$$V_s = \{(\rho_0/\rho_1) - 1\} \times 100 (\%) \qquad (2)$$

If the whole cell fraction is less than 2%, the braking performance on ice of a tire using the rubber composition may not be sufficient because absorption and removal of the liquid layer are lessened. On the other hand, if the whole cell fraction exceeds 50%, the abrasion resistance, the tear resistance and the crack resistance may fall below the allowable levels. Accordingly, both are not preferred.

It is a matter of course that the rubber composition for a tire tread according to the present invention can suitably be blended with, in addition to the components described above, compounding ingredients including fillers such as carbon black and silica, softening agents such as aroma oil and spindle oil, antioxidants, vulcanizing agents, vulcanization accelerators and accelerator activators in suitable amounts which are usually blended.

In the present invention, the rubber component described above, the thermoplastic resin having the characteristics described above, a foaming agent, a filler such as carbon black and other ingredients are kneaded by means of a mixer such as a roll and an internal mixer, whereby the rubber composition for a tire tread can be prepared.

The kneading process may be divided into several stages, and the highest temperature of the kneaded mixture has to be higher than the melting point of blended polyethylene at least at one stage before the final stage. In particular, the temperature is preferably higher by 10° C. or more than the melting point of the blended polyethylene. If the kneading is carried out in the state that this highest temperature is lower than the melting point of polyethylene, the viscosity of polyethylene is high, so that the dispersibility of polyethylene and the affinity thereof with the matrix rubber may not be satisfactory and as a result, a reduction in the rupture characteristic of the blended composition is brought about in a certain case.

The resulting rubber composition for a tire tread is excellent in extrusion stability and provides the tire using the rubber composition with an excellent performance on ice, abrasion resistance and tear resistance. That is, it is not until a polyethylene having a relatively high melting point and a relatively low softening point is used for the foamed rubber composition that the durability thereof (abrasion resistance, crack resistance and tear resistance: the melting point is involved therein) can be compatible with the processability and the workability (the softening point is involved therein).

Further, the pneumatic tire of the present invention uses the rubber composition for a tire tread having the characteristics described above for the tire tread part and therefore efficiently absorbs and removes a liquid layer on ice, which causes a reduction in a friction coefficient, without having the increased amount of cells themselves which may become breaking nuclei for abrasion, so that it is excellent in a performance on ice, abrasion resistance, crack resistance, tear resistance, processability and workability.

EXAMPLES

The present invention shall be explained below in further details with reference to examples and comparative examples, but shall not be restricted to these examples. A blending unit in the following Table 1 and Table 2 is part by weight.

Examples 1 to 5 and Comparative Examples 1 to 6

Rubber compositions having blending formations shown in the following Table 1 and Table 2 were prepared. The blending process consists of two stages, and at the first stage, a rubber component, polyethylene, carbon black, stearic acid and zinc oxide were mixed and kneaded at 150° C. Then, at the second stage, a vulcanizing agent, a vulcanization accelerator, a foaming agent and a foaming aid were added thereto and kneaded at a temperature (100° C.) lower than at the first stage.

The rubber compositions thus obtained were vulcanized and subjected to various measurements according to the following methods to evaluate properties. The vulcanizing conditions were 145° C. and 30 minutes.

The results thereof are shown in Table 1 and Table 2.

Evaluation of Extrusion Stability

Volumes of the rubber composition were measured immediately after extruded from a nozzle under the condition of 110° C. by means of an 8 inch extruder and in 30 seconds after the extrusion.

The extrusion stability was evaluated by a shrinkage factor which is obtained by comparing a volume in 30 seconds after extrusion/a volume immediately after extrusion.

The value of Comparative Example 1 was set at 100, and the larger the value, the more excellent the extrusion stability. The value of 80 or more is an operable level without any problem; the value of 70 to 80 is an operable level; and the value of less than 70 is an inoperable level.

Next studless tires having a size of 11R22.5 in which the rubber compositions prepared in the examples and the comparative examples were used for tread parts were produced and subjected to car tests for performance on ice, abrasion resistance and tear resistance.

Evaluation of Performance on Ice

Braking distances (30 km/hour) on a frozen road were measured after the tires had been mounted on a car and used for driving 50 km, wherein the reciprocals of the measured values were used for the evaluation and the value of Comparative Example was set at 100. The larger the value, the more excellent the performance on ice.

Evaluation of Abrasion Resistance

The same tires as used in evaluation of the performances on ice described above were used and evaluated by cars. Depths of the remaining grooves after run 20,000 km were measured and the value of Comparative Example 1 was set at 100. The larger the value, the more excellent the abrasion resistance.

Evaluation of Tear Resistance

The same tires as used in evaluation of the performances on ice described above were used and evaluated by a running-on-curb test on a test course. The number of cracks found at the bottoms of grooves were measured after run 20,000 km and the reciprocals of the measured values were used for the evaluation and the value of Comparative Example 1 was set at 100, and the larger the value, the more excellent the tear resistance.

TABLE 1

| | | Comparative Example | | | | | |
| --- | --- | --- | --- | --- | --- | --- | --- |
| | | 1 | 2 | 3 | 4 | 5 | 6 |
| Blending Formation | NR/BR | 70/30 | 70/30 | 70/30 | 70/30 | 70/30 | 70/30 |
| | Carbon black | SAF = 50 | SAF = 50 | SAF = 50 | SAF = 50 | SAF = 50 | SAF = 50 |
| | Stearic acid/zinc oxide | 4/3.5 | 4/3.5 | 4/3.5 | 4/3.5 | 4/3.5 | 4/3.5 |
| | Accelerator (CZ)/sulfur | 1/1 | 1/1 | 1/1 | 1/1 | 1/1 | 1/1 |
| | Foaming agent (ADCA) | 5 | 7 | 5 | 5 | 5 | 5 |
| | Foaming aid (urea) | 2 | 2.5 | 2 | 2 | 2 | 2 |
| | Thermoplastic resin kind | None | None | LDPE | HDPE | L-LDPE | L-LDPE |
| | Melting point (° C.) | | | 108 | 136 | 125 | 125 |
| | Softening point (° C.) | | | 91 | 128 | 88 | 88 |

TABLE 1-continued

|  |  | Comparative Example | | | | | |
|---|---|---|---|---|---|---|---|
|  |  | 1 | 2 | 3 | 4 | 5 | 6 |
| Properties of Rubber composition | Density |  |  | 0.920 | 0.964 | 0.921 | 0.921 |
|  | Blending amount (phr) |  |  | 5 | 5 | 0.5 | 45 |
|  | Whole cell fraction (%) | 20 | 30 | 20 | 20 | 20 | 20 |
| Performance of Tire | Performance on ice | 100 | 110 | 100 | 100 | 100 | 92 |
|  | Abrasion resistance | 100 | 80 | 100 | 130 | 102 | 157 |
|  | Tear resistance | 100 | 80 | 100 | 125 | 102 | 142 |
|  | Extrusion stability | 100 | 100 | 100 | 60 | 100 | 75 |

TABLE 2

|  |  | Example | | | | |
|---|---|---|---|---|---|---|
|  |  | 1 | 2 | 3 | 4 | 5 |
| Blending Formation | NR/BR | 70/30 | 70/30 | 70/30 | 70/30 | 70/30 |
|  | Carbon black | SAF = 50 | SAF = 50 | SAF = 50 | SAF = 50 | SAF = 50 |
|  | Stearic acid/zinc oxide | 4/3.5 | 4/3.5 | 4/3.5 | 4/3.5 | 4/3.5 |
|  | Accelerator (CZ)/sulfur | 1/1 | 1/1 | 1/1 | 1/1 | 1/1 |
|  | Foaming agent (ADCA) | 5 | 5 | 5 | 5 | 7 |
|  | Foaming aid (urea) | 2 | 2 | 2 | 2 | 2.5 |
|  | Thermoplastic resin kind | L-LDPE | L-LDPE | L-LDPE | L-LDPE | L-LDPE |
|  | Melting point (° C.) | 125 | 124 | 125 | 125 | 125 |
|  | Softening point (° C.) | 88 | 102 | 88 | 88 | 88 |
|  | Density | 0.921 | 0.921 | 0.921 | 0.921 | 0.921 |
|  | Blending amount (phr) | 5 | 5 | 12 | 30 | 5 |
| Properties of Rubber Composition | Whole cell fraction (%) | 20 | 20 | 20 | 20 | 30 |
| Performance of Tire | Performance on ice | 100 | 100 | 100 | 97 | 110 |
|  | Abrasion resistance | 130 | 132 | 145 | 155 | 110 |
|  | Tear resistance | 125 | 127 | 130 | 140 | 105 |
|  | Extrusion stability | 100 | 98 | 99 | 85 | 100 |

Comments on the Results Shown in Tables 1 and 2

As apparent from the results shown in Tables 1 and 2, it has been confirmed that the rubber compositions prepared in Examples 1 to 5 falling in the scope of the present invention as shown in Table 2 are excellent in extrusion stability, and the tires using these rubber compositions are excellent in a performance on ice, abrasion resistance and tear resistance as compared with the rubber compositions prepared in Comparative Examples 1 to 6 falling outside the scope of the present invention.

To observe individually Comparative Examples 1 to 6 shown in Table 1, by comparing Comparative Examples 1 (control) and 2, it can be found that as the cell fraction is increased without blending any thermoplastic resin, the abrasion resistance and the tear resistance are inferior in Comparative Example 2. In Comparative Example 3, low density polyethylene (LDPE) having a melting point which fell outside the scope of the present invention was blended. In Comparative Example 4, high density polyethylene (HDPE) in which the melting point, the softening point and the density fell outside the scope of the present invention was blended, and it can be found that no improvement can be observed or the extrusion stability is inferior in these cases. Further, in Comparative Examples 5 and 6, blended was low density polyethylene (L-LDPE) in which the melting point, the softening point and the density fell in the scope of the present invention but the blending amounts of which fell outside the scope of the present invention in both cases. It can be found that little predominance over Comparative Example 1 (control) is observed in Comparative Example 5 and that the extrusion stability is inferior in Comparative Example 6.

As illustrated above, L-LDPE shows better workability compared to HDPE due to a low density, as well as better reinforcing ability compared to LDPE due to its high crystalinity, and thus a rubber composition simultaneously showing good workability and good fracture resistance can be obtained.

What is claimed is:

1. A rubber composition for a tire tread comprising a foamed rubber composition prepared by blending 100 parts by weight of at least one rubber component selected from the group consisting of natural rubber and diene based synthetic rubbers with 1 to 40 parts by weight of a thermoplastic resin having a melting point of 120 to 130° C., a density of 0.92 to 0.935 and a softening point of 80 to 110° C.

2. The rubber composition for a tire tread as described in claim 1, wherein said thermoplastic resin is a linear polyethylene or a modified linear polyethylene obtained by modifying a part of a linear polyethylene.

3. A pneumatic tire comprising a tread part characterized by using the rubber composition for the tire tread as described in claim 1.

4. A pneumatic tire comprising a tread part characterized by using the rubber composition for the tire tread as described in claim 2.

* * * * *